Patented Aug. 10, 1937

2,089,562

UNITED STATES PATENT OFFICE 2,089,562

PROCESS OF PRODUCING BUTYL ALCOHOL

David A. Legg and Hugh R. Stiles, Terre Haute, Ind., assignors to Commercial Solvents Corporation, Terre Haute, Ind., a corporation of Maryland No Drawing. Application June 12, 1933, Serial No. 675,458

19 Claims. (Cl. 195—44)

Our invention relates to the production of butyl alcohol and other valuable products by the fermentation of sugar-containing solutions. More specifically, our invention relates to the production of normal butyl alcohol, acetone, and ethyl alcohol by the fermentation of sugar solutions by means of bacteria designated herein as *Clostridium inverto-acetobutylicum*.

It has previously been known that sugar solutions could be fermented by means of organisms of the *Clostridium butyricum* group with the production of various products such as acetic and butyric acids, butyl alcohol, etc. (see for example Bergey's Manual of Determinative Bacteriology, Williams & Wilkins Co., Baltimore, 1930, pages 434–5). However, the yields of butyl alcohol have in all cases been so low as to preclude commercial utilization of such fermentations. Therefore, in spite of the fact that crude sugar solutions represent the cheapest source of raw material, up to the present time the production of butyl alcohol has been accomplished only by the fermentation of starch mashes by organisms of the type *Clostridium acetobutylicum* (Weizmann).

The organisms of the *Clostridium butyricum* group have never been shown to be fermenting agents of a commercial character but have been discarded as members of that long list of micro-organisms which produce the desired products, but in such small amounts as not to be economically feasible. The bacteria of this group produce acids and neutral end-products of the type produced by butyl organisms such as *Clostridium acetobutylicum* (Weizmann) and have a peaked acidity curve for the fermentation of the same general type as that produced by the Weizmann organism. The butyl organisms of the *Clostridium acetobutylicum* type maintain their optimum hydrogen ion concentration in the mash without the necessity of control by means of neutralizing agents or the like. In fact, it has been shown that the addition of materials tending to change the hydrogen ion concentration has a definite deleterious effect upon certain of these organisms. For example, Grimbert (Ann. de l'Inst. Past. 7, 353), DuClaux (Ann. de l'Inst. Past. 9, 811), and McCoy et al. (Jour. Infect. Dis., 39, 457) have shown that an addition of calcium carbonate to the mash produces a marked decrease in the yield of butyl alcohol. The natural assumption has therefore been that any attempts to reduce the hydrogen ion concentration of fermentations by organisms of the *Clostridium butyricum* group would likewise reduce the yields of neutral end-products.

However, we have discovered that the group of bacteria herein designated as *Clostridium inverto-acetobutylicum* will produce high yields of butyl alcohol from commercial sugar-containing mashes if there are maintained certain fermentation conditions, especially an accurate control of the hydrogen ion concentration by means of such substances as calcium carbonate. So much confusion exists in the nomenclature and reported cultural characteristics of the prior art organisms of the *Clostridium butyricum* type that it is impossible to state definitely if any of them are included in the group now designated as *Clostridium inverto-acetobutylicum*. For example, a culture purporting to be *Clostridium Beijerinckii* has been found to come within the classification *Clostridium inverto-acetobutylicum* of the present invention in spite of the fact that in certain reports in the literature this culture has been described as having properties which would exclude it from this classification. It is to be understood, therefore, that our invention includes within its scope the use of any of the prior art bacteria which have in fact the characteristics hereinafter specified, irrespective of the characteristics reported in the literature. It is to be further understood, of course that our invention relates to the use of this group of organisms only under the newly devised fermentation conditions to be hereinafter specified and not to the use of these organisms generally, under any conditions.

The various conditions which we have found to be essential for the production of high yields of solvents from commercial sugar-containing mashes by organisms of this group are briefly: the presence of inverted carbohydrate as the source of carbohydrate, the presence of degraded protein (including ammonia) as the source of nitrogen, a fermentation temperature below 35° C., preferably 28–32° C., and the control of the acidity of the mash during the fermentation such that the final hydrogen ion concentration, obtained by the action of the bacteria, falls within the range of pH 5.0–6.5, preferably 5.7–6.1. Of course, other known fermentation conditions which are usually employed with any organism of this general type, such as the presence of necessary mineral elements, phosphates, etc., will be employed in the usual manner known to those skilled in the art.

The most essential element of the fermentation of our invention is the control of the hydrogen ion concentration so that the final pH secured by the action of the bacteria falls within the specified limits. In practically all other known fermentations in which neutral end-products are secured, the adjustment of the initial hydrogen ion concentration has been considered to be of most importance. If this initial hydrogen ion concentration is adjusted within the operative limits, the fermentation will proceed normally and no attention need be paid to the final hydrogen ion concentration. However, we have found in the present case that although the initial hydrogen ion concentration may vary over a considerable range, the final pH obtained by the action of the bacteria must fall within definite limits if consistent high yields of solvents are to be secured.

We have found that the final pH secured by the action of the bacteria may be controlled by the introduction of certain materials into the mash at the beginning of the fermentation. For example, we have found that if calcium carbonate, barium carbonate, iron carbonate, or other insoluble non-toxic base, is added to the mash in an amount sufficient to neutralize any free acidity, and an amount in excess of this to the extent of about 6–8% on the weight of the sugar, the final pH of the fermentation will be found to fall within the operative range. We have further discovered that it is sometimes desirable to lower the final hydrogen ion concentration even more than is accomplished by this addition; but it has been found that further addition of an insoluble neutralizing agent produces undesirable results. The reason for this is not known, but it is possible that it may be due to the fact that too much acid is fixed and the equilibrium is thereby shifted to an undesirable extent. Further decrease of the final hydrogen ion concentration may, however, be secured by introducing a small amount of ammonia or a basic ammonium salt, in addition to the insoluble neutralizing agent. In this manner the final pH of the fermentation may readily be secured within the narrower preferred limits of 5.7–6.1. Although the various materials mentioned may be satisfactorily used in our process, calcium carbonate has been found, in most cases, to be especially well suited for this purpose, and is to be preferred from an economic standpoint. However, in choosing the material to be employed, the composition of the medium should be considered, and a material chosen which will not give rise to an undesirable concentration of a particular metal ion, even though generally considered to be non-toxic in character.

The amount of calcium carbonate or other non-toxic insoluble base to be added in excess of that necessary to neutralize the free acidity of the mash will be found to vary somewhat in individual cases, but in general it may be said to be from 3.5% to 10% of the weight of the sugar in the mash. Various samples of these materials will differ in respect to the amount necessary, due to the physical properties of the material and also to its chemical properties, as for example, the presence of substantial amounts of lime. However, in any case, a preliminary fermentation will enable one skilled in the art to determine the optimum concentration for the calcium carbonate employed, or to determine the amount of ammonia or the like to be added along with any particular sample of calcium carbonate. The calcium carbonate or other insoluble base used should, in general, be sufficiently finely divided so that when resting on the bottom of the fermentaton vessel they will present a considerable surface to the fermenting mash. When employing this means of controlling the hydrogen ion concentration, undue agitation should be avoided so as to prevent the possibility of fixing too large a percentage of the acids produced in the early stages of the fermentation, and thus undesirably displacing the equilibrium of the fermentation. It should be definitely understood that the purpose of the addition of the basic materials in this process is not to neutralize all of the acids produced in the fermentation, but merely to control the hydrogen ion concentration in such a manner that the final pH secured by the action of the bacteria (and not by the action of neutralizing agents) falls within the specified limits.

It is to be understood that our invention is not to be limited to the particular means employed for securing the desired final hydrogen ion concentration. Any equivalents or modifications which would naturally occur to one skilled in the art may, of course, be employed. For example, an accurate pH control may be maintained by continuous or semi-continuous addition of an alkaline material, such as ammonia, during the active stage of the fermentation and until after the "acidity break". However, the mechanical difficulties of procedures of this nature are well known to those skilled in the art. Even a slight over-neutralization at any time during the fermentation will often result in inhibiting further active fermentation for a period of many hours or even days. Consequently, automatic electrometric titration apparatus is most desirable if such a procedure is employed. In any procedure of this nature, the pH should be controlled to approximately that obtained when the specified amounts of insoluble basic materials are employed. In view of the difficulties of such procedures, we prefer to secure the desired pH control by introducing materials of the insoluble type into the mash before fermentation begins. It is to be understood, therefore, that the phrase "supplying neutralizing agents to the mash throughout the fermentation", as used in the appended claims, includes within its scope either the continuous or semi-continuous condition of soluble alkali, or the addition of an insoluble alkaline neutralizing agent in which latter case the material may all be incorporated in the initial mash prior to fermentation.

Furthermore, from the standpoint of simplicity of operation, we prefer to control the acidity of the mash during the fermentation by means of the insoluble materials such as calcium carbonate. We have found that for a wide range of grades of molasses, approximately 6–8% of calcium carbonate, or the like, on the weight of the sugar in the mash, secures adequate control of the acidity such that the final hydrogen ion concentration secured by the action of the bacteria falls within the desired limits. This fact may be seen to obviate the necessity for individual treatment of each sample of molasses unless the ultimate possible yield is desired.

The temperature range which we have found to be essential for this fermentation is within the limits 25° C. to 36° C. Growth will occur and sometimes active fermentation may take place over a wider range, but for consistent high yields of solvents from commercial sugar-containing mashes the temperature must be maintained within the range 28°–33° C. and preferably within the narrower range 29–31° C.

With regard to the necessary nutrients for this fermentation, it may be said that degraded protein nitrogen is essential. As used here and in the appended claims, the term "degraded protein nitrogen" is to be taken as including hydrolytic degradation products such as polypeptides, amino acids, etc., metabolic degradation products such as urea, etc., and the final degradation product ammonia, and its salts. It is preferred to use ammonia (preferably in the form of a salt such as the sulphate, etc.), but partially degraded protein materials such as yeast water, steep water, etc. have been found to be eminently satisfactory. Although undegraded protein, such as corn gluten, corn germ meal, and the like cannot be utilized as the sole source of nitrogen, small amounts of such materials, in addition to ammonia or degraded protein sometimes produce improved results. Other nutrient materials such as mineral elements, e. g., phosphates and the like, should be present in small amounts as in the case of other known fermentations. However, if crude sugar solutions such as inverted molasses mashes are employed, these materials will usually be found to be present in sufficient amounts. The amount of ammonia or degraded protein to be added will also vary with the raw material used. For example, certain samples of molasses may be found to have sufficient ammonium compounds and other degraded protein so that very little more or perhaps none need be added. In general, it may be said that with cane molasses mashes 0.5 to 1.2% of $NH_3$ as $(NH_4)_2SO_4$ on the weight of the sugar or an equivalent amount of other degraded protein, will give satisfactory results.

The following is a typical medium which we have found to be suitable for laboratory fermentations:

*Inverted molasses medium (Medium I)*

Cuban molasses at about 20% sugar concentration is inverted by heating with sulphuric acid equivalent to 5% on the weight of the sugar for 40 minutes at 20 lbs. pressure. At the conclusion of the inversion, about 0.7% of ammonia on the weight of the sugar is added and subsequently sufficient finely-divided calcium carbonate is introduced to neutralize the remaining free acidity. An excess of calcium carbonate amounting to about 6% on the weight of the sugar is then introduced and the mash is diluted to a sugar concentration of about 5% and sterilized for 30 minutes at 20 lbs. pressure. It may be desirable to reduce the steam pressure and increase the time of inversion and sterilization so as to avoid caramelization of the sugar due to local overheating. In this case 2 hours at 5 lbs. pressure is roughly equivalent to 40 minutes at 20 lbs.

Of course, it is well known to those skilled in the art that different samples of molasses vary in a number of respects, such as sugar content, ash content and the like. These variations naturally change somewhat the mashing procedure in different cases. For example, although Cuban molasses usually contains sufficient non-nitrogenous nutrients, it has been found to be desirable to add mineral elements such as phosphates and the like to certain samples of Louisiana molasses. In any particular case, one skilled in the art may determine the special requirements, if any, by preliminary fermentations. However, such changes in mashing procedure for various types of molasses will be necessary only to secure the absolute maximum yield. Very satisfactory yields can be secured in practically all cases by means of the procedure outlined above.

The bacteria which have been designated as the group *Clostridium inverto-acetobutylicum* in our invention and which are so designated in the appended claims, comprise any bacteria having the following characteristics:

I. Morphological
  A. Rod-shaped
  B. Spore-forming—Clostridia and Plectridia
  C. Practically indistinguishable from members of the *Clostridium butyricum* group II. Biochemical
  A. Carbohydrate fermentation
    1. Inability to produce appreciable yields of butyl alcohol and acetone from starch as the only source of carbohydrate.
    2. Inability to produce appreciable yields of butyl alcohol and acetone from sucrose as the only source of carbohydrate.
    3. Inability to consistently produce yields greater than 20% on the weight of the sugar from uninverted molasses.
    4. Ability to produce high yields of butyl alcohol and acetone from glucose or inverted molasses.
  B. Nitrogen metabolism
    1. Ability to produce high yields of butyl alcohol and acetone in sugar media containing ammonia as the principal source of nitrogen.
    2. Ability to utilize degraded protein (including ammonia) as the sole nitrogen source.
    3. Inability to utilize undegraded protein as sole source of nitrogen.
    4. Inability to liquefy gelatin or to produce more than very slight proteolysis of milk.
  C. Oxygen requirements
    1. Anaerobic.
  D. Temperature range for solvent production
    1. From 25° C. to 36° C., preferably 29° C. to 31° C.
  E. Hydrogen ion concentration for solvent production
    1. Final pH of 5.0–6.5, preferably 5.7–6.1.

The above outline is believed to be sufficient to enable one skilled in the art to identify the organisms in question. A complete characterization such as that of the Descriptive Chart of the Society of American Bacteriologists would not only be unnecessary but would be confusing since different members of this group of organisms would vary in a number of minor particulars having no bearing upon the present case. All organisms having in common the above characteristics come within the scope of this invention, irrespective of further properties which they may possess.

In view of the uncertainty in the literature as to methods utilized for certain of the biochemical tests referred to above, we believe it to be desirable to amplify, somewhat, the characteristics briefly outlined. For example, the fermentation characteristics referred to under the heading "carbohydrate fermentation" are those characteristics determined under optimum conditions, as for example, in the inverted molasses medium described above or in similar media containing other carbohydrates. It should be particularly noted that these and all other fermentation characteristics described in this specification relate to the fermentation of a commercial mash, i. e., one which has a sugar concentration of the order of 5%. Quite different results may be obtained with laboratory media containing lower percentages of sugar. It should also be noted that fermentation characteristics such as these refer to normal consistent results and not to abnormally low or high results which may sometimes be obtained with any culture. A typical carbohydrate fermentation test of an organism falling in this group is given below as an illustration.

| Medium No. | Composition (% by weight of mash) | Solvent yield (% of carbohydrate) |
|---|---|---|
| II | 7% corn mash | Trace. |
| III | 7% corn mash<br>0.5% CaCO₃ | Trace. |
| IV | 25% potato mash<br>0.6% CaCO₃ | Trace. |
| V | 5.5% glucose<br>0.5% CaCO₃ in 10% yeast water | 27.3 |
| VI | 5.0% sucrose<br>0.3% (NH₄)₂HPO₄<br>0.2% (NH₄)₂SO₄<br>0.05% NH₄Cl<br>0.05% MgSO₄<br>0.5% CaCO₃ | 9.4 |
| VII | 5.0% sugar as uninverted molasses<br>0.15% (NH₄)₂SO₄<br>0.4% CaCO₃ | 17.2 |
| I | 5.0% sugar as inverted molasses (medium prepared as previously described). | 30.8 |

With regard to the nitrogen metabolism, the undegraded protein materials referred to are such materials as corn gluten and corn germ meal; the degraded protein referred to comprises such materials as yeast water, steep water, and urea, and the gelatin liquefaction refers to incubation on nutrient gelatin containing 2% glucose. For example, stab cultures on such medium were incubated at 22° C. and shake cultures were incubated at 30° C. Excellent growth was obtained in each case but at the end of 30 days the gelatin was in all cases found to be solid at 22° C. The proteolysis of milk refers to tests such as the standard litmus milk test. In litmus milk, organisms of this group first reduce the litmus and then give a somewhat rennet-like acid curd which shows only slight digestion at the end of 30 days.

It is to be noted that the statements in the outline regarding the nitrogen requirements of these organisms refer to the suitability of nitrogeous nutrients for the production of consistent high yields of solvents and not to the ability or inability to utilize such forms of nitrogen for growth or slight fermentation. For example, undegraded protein such as a mixture of corn gluten and corn germ will give a slight fermentation, e. g., a solvent yield of one or two percent, and inverted molasses medium will give a fair yield, i. e., up to 20% or so, in some cases, without the addition of ammonia or other degraded protein nutrient.

It is further to be noted that the utilization of ammonia is specified as the principal source of nitrogen rather than the sole source for optimum solvent production. These organisms can utilize ammonia as the sole source of nitrogen, in some cases with optimum solvent yield, but for consistent high yields of solvents it is preferred to have a small amount of some other degraded protein material present in addition to the ammonia. This additional amount, however, is generally present in such materials as molasses so that in this case the use of ammonia alone will serve to produce optimum yields.

The term "anaerobic" as used in the above outline, refers to the inability of the organisms to grow on the surface of nutrient glucose agar when incubated aerobically. The organisms, are, however, capable of developing and producing satisfactory fermentation in deep liquid medium when incubated aerobically due to the anaerobic conditions maintained within the medium.

The temperature and hydrogen ion concentration ranges referred to do not represent the entire ranges within which growth will occur but represent merely the ranges within which high yields of solvents may be obtained when operating under the other conditions specified. Also, the solvent ratios which are given as characteristic of the organism are those which are normally consistently obtained under optimum conditions and do not refer to abnormal ratios which may sometimes be secured with any of the cultures. Furthermore, it is to be understood that the characteristics specified for these organisms are not to be taken as limited to the specific methods and data given above. These were given merely by way of illustration, whereas the characteristics of the organisms as claimed in our invention are those given generally in the outline.

The organisms of this group are widely distributed in nature and may be isolated from such various sources as soil, rotted wood, grain, corn stalks, river mud, and the like. In view of the characteristics listed above, one skilled in the art may readily isolate these organisms from such sources by known methods of isolation. Of course, as is apparent to one skilled in the art, these organisms cannot be isolated from every sample of material tested. However, if a number of different materials are tried, a good culture will nearly always be secured. The following specific example is given as illustrative of one of the methods applicable to this purpose:

A large number of flasks, say twenty each of the following media are prepared:

| Medium No. | Composition % by weight of mash |
|---|---|
| I | As described above. |
| VIII | 3.0% glucose.<br>0.1% (NH₄)₂SO₄.<br>0.15% (NH₄)₂HPO₄.<br>0.05% NH₄Cl.<br>0.05% MgSO₄.<br>0.3% CaCO₃.<br>Initial pH adjusted to 6.0. |

These media are sterilized in the usual manner and while still hot, e. g., 80–85° C., are inoculated with samples of soil, mud, corn, corn stalks, rotted wood, and the like. The flasks are held at the inoculating temperature for a short time, e. g., 1 to 3 minutes, and are then rapidly cooled to 32° C. and incubated at this temperature. The cultures evidencing the strongest fermentation at the end of 48 hours are chosen for further investigation and are allowed to sporulate for at least five days at 32° C. The cultures are then transferred to flasks at Medium I while the latter is still hot, e. g., 95–100° C. After not more than one minute at this temperature, they are cooled rapidly to 32° C. and incubated at this temperature. This procedure may then be repeated a number of times to further enrich the cultures, but as a rule, at the end of the third transfer a number of cultures will show sufficient activity to warrant quantitative determination of the solvents. Those cultures which show fair yields, for example yields of 15% or over, on the weight of the sugar, may then be tested on Medium I and Medium IX (which is the same medium as Medium I, containing uninverted molasses) or the cultures may be plated at this stage, if desired. In the former case, those cultures which show good yields on Medium I and poor yields on Medium IX are then chosen for further quantitative fermentations. If the results of these fermentations show high yields of solvents with proportions of butyl alcohol, acetone, and ethyl alcohol within the limits specified above, the desired cultures have been obtained. These may then be further purified by plating if desired.

If the cultures are plated after the first quantitative fermentation, this may be done in the usual manner utilizing such media as standard glucose-yeast water agar, standard nutrient agar containing 2.0% glucose and 0.1% $(NH_4)_2SO_4$, and the like. These plates may then be incubated anaerobically at 32° C. and after growth is evidenced, colonies may be tested quantitatively on Medium I after several 24 hour transfers on similar medium. The desired cultures may then be chosen on the basis of the quantitative results. Further plating for selection of good strains may be made if desired. Cultures of these bacteria may be stored in the usual manner in the form of spore cultures, but unless the spore cultures are stored on dried sterile soil or some highly buffered medium, they should be transferred every 10 days to Medium I containing 3-5% sugar and allowed to germinate.

It is to be understood, of course, that the above isolation procedures are illustrative only and may be varied in any manner known to those skilled in the art. Furthermore, it is to be understood that the present invention is not limited to the use of cultures isolated by this or any other method; but, as has been previously stated, it includes within its scope any previously obtained bacteria from any source which have the characteristics herein outlined.

When utilizing bacteria of this group for large scale fermentations, it is necessary to take certain precautions with regard to the inoculant in order to insure consistent high yields. The amount of inoculant used should be from 2-5% by volume, preferably 3-4%. Also the inoculant should be at least the second generation removed from the spore state and preferably the fourth to sixth generation. Of course in large scale operations this latter may readily be accomplished by the successive transfers required to build up the necessary volume of inoculant. The transfers may be made at 24 hours on medium of the type of Medium I containing 3-5% of sugar.

The products obtained in the fermentation of commercial sugar media containing about 5% sugar, e. g., a 10% molasses mash, are normal butyl alcohol, acetone, and ethyl alcohol, the yields usually ranging from 28-32% of total solvents on the weight of the sugar. The following solvent ratios are obtained:

Butyl alcohol_____ above 60%; usually 64-70%
Acetone_____ above 20%; usually 24-30%
Ethyl alcohol_____ below 10%; usually 2-5%

The gases given off during the fermentation consist of carbon dioxide and hydrogen in the ratio of $CO_2/H_2$ of the order of magnitude of 2/1.

The following specific examples will serve to illustrate the process of the present invention:

*Example I*

Medium I containing 5% sugar was inoculated with 2.5% of a culture obtained from a rotted corn stalk and incubated at 31° C. for 68 hours. The yield and solvent ratio were found to be as follows:

| Yield percent on sugar | Solvent ratio | | |
|---|---|---|---|
| | Butyl alcohol | Acetone | Ethyl alcohol |
| 28.8 | 70.3 | 24.2 | 5.5 |

*Example II*

Medium I containing 5% sugar was inoculated with 3% of a fourth generation culture of bacteria purporting to be *Clostridium Beijerinckii* and incubated at 32° C. for 72 hours. The yield and solvent ratio were then determined and found to be as follows:

| Yield percent on sugar | Solvent ratio | | |
|---|---|---|---|
| | Butyl alcohol | Acetone | Ethyl alcohol |
| 30.8 | 67.0 | 28.6 | 4.4 |

*Example III*

A medium was prepared as in the case of Medium I, with the exception that the neutralization after inversion was accomplished by lime instead of ammonia and 0.6% steep water (wet basis) calculated on the total weight of the mash was substituted for the ammonia as the nitrogenous nutrient. The sterile mash was inoculated with 3% of a fourth generation culture of bacteria purporting to be *Clostridium Beijerinckii* and incubated for 72 hours at 32° C. A solvent yield of 29.2% was obtained.

*Example IV*

Two fermentations were carried out as in Example II with the exception that in addition to the determination of solvent yield and solvent ratio, the fermentation gases were collected and analyzed. The following results were secured:

| Solvent yield percent on sugar | Solvent ratio | | | Gas yield percent of sugar | Gas ratio percent by vol. | |
|---|---|---|---|---|---|---|
| | Butyl alcohol | Acetone | Ethyl alcohol | | $CO_2$ | $H_2$ |
| 30.6 | 72.5 | 24.0 | 3.5 | 44.2 | 68 | 32 |
| 29.6 | 71.3 | 24.3 | 4.4 | 33.4 | 60 | 36 |

The results of Example IV are representative of the process of this invention and show clearly the commercial advantages thereof. High yields of solvents are obtained, the proportion of butyl alcohol in the products is high and the proportion of hydrogen in the gaseous products is high, which latter is advantageous from the standpoint of utilization of the gases for catalytic synthesis.

*Example V*

A medium was prepared from Louisiana molasses as in the case of Medium I so as to contain 5.5% of sugar, 0.7% of ammonia, on the weight of the sugar, as ammonium sulphate, and an excess of calcium carbonate equal to 5.5% of the sugar. After sterilization and prior to inoculation additional NH₃ equal to 0.35% of the sugar was added as NH₄OH. The mash was inoculated with 4% of fourth generation 24 hour cultures of a newly isolated strain of the group *Clostridium invertoacetobutylicum* and incubated at 30° C. for 68 hours with the following results:

| Solvent yield percent on sugar | Final pH | Solvent ratio | | |
|---|---|---|---|---|
| | | Butyl alcohol | Acetone | Ethyl alcohol |
| 31.0 | 5.81 | 69.8 | 29.2 | 1.0 |

It is understood, of course, that the examples given above, by way of illustration, are not to be taken as limiting our invention to the specific materials or methods employed. For example, other sources of inverted carbohydrate may be utilized, as for example, wood sugar, hydrolyzed beet molasses, hydrol (the mother liquor from the crystallization of corn sugar), hydrolyzed whey, and the like. It is necessary, however, to insure substantially complete hydrolysis or inversion of any of the sources of carbohydrate employed. For example, wood sugar and hydrol, containing a large percentage of simple sugars, also contain substantial amounts of polysaccharides which should be further inverted before utilizing them in the present process. Likewise, various other sources of degraded protein nitrogen, such as amino acids, urea, and the like, may be employed. The hydrogen ion control may also be effected by means of materials other than those specifically mentioned. For example, other non-toxic materials which are substantially water-insoluble may be used, or soluble materials may be used if they are added in such a manner as to simulate the effect of the non-soluble materials in the amounts specified.

By the term "inverted carbohydrate", as used in the appended claims, is meant fermentable monose sugars and the fermentable inversion products of the higher carbohydrates.

In general, it may be said that equivalents and modifications of procedure which would naturally occur to one skilled in the art may be employed without departing from the scope of our invention.

The invention now having been described, what we claim is:

1. In a process for the production of normal butyl alcohol, acetone, and ethyl alcohol by subjecting a fermentable mash containing inverted carbohydrate, as the principal fermentable carbohydrate, to the action of a culture of bacteria of the group herein described and designated as *Clostridium inverto-acetobutylicum*, the improvement which comprises supplying nitrogenous nutrient to the mash in the form of degraded protein nitrogen, and supplying non-toxic alkaline neutralizing agents to the mash throughout the fermentation to control the acidity thereof whereby the final hydrogen ion concentration secured by the action of the bacteria falls within the range pH 5.0 to pH 6.5.

2. In a process for the production of normal butyl alcohol, acetone, and ethyl alcohol by subjecting a fermentable mash containing inverted carbohydrate, as the principal fermentable carbohydrate, to the action of a culture of bacteria of the group herein described and designated as *Clostridium inverto-acetobutylicum*, at temperatures from 25° C. to 36° C., the improvement which comprises supplying nitrogenous nutrient to the mash in the form of degraded protein nitrogen, and supplying non-toxic alkaline neutralizing agents to the mash throughout the fermentation to control the acidity thereof whereby the final hydrogen ion concentrations secured by the action of the bacteria falls within the range pH 5.0 to pH 6.5.

3. In a process for the production of normal butyl alcohol, acetone, and ethyl alcohol by subjecting a fermentable mash containing inverted carbohydrate, as the principal fermentable carbohydrate, to the action of a culture of bacteria of the group herein described and designated as *Clostridium inverto-acetobutylicum*, at temperatures from 25° C. to 36° C., the improvement which comprises supplying nitrogenous nutrient to the mash in the form of degraded protein nitrogen, and supplying substantially water insoluble non-toxic alkaline neutralizing agents to the mash throughout the fermentation to control the acidity thereof whereby the final hydrogen ion concentration secured by the action of the bacteria falls within the range of pH 5.0 to pH 6.5.

4. In a process for the production of normal butyl alcohol, acetone, and ethyl alcohol by subjecting a fermentable mash containing inverted carbohydrate, as the principal fermentable carbohydrate, to the action of a culture of bacteria of the group herein described and designated as *Clostridium inverto-acetobutylicum*, at temperatures from 25° C. to 36° C., the improvement which comprises supplying nitrogenous nutrient to the mash in the form of degraded protein nitrogen, and supplying calcium carbonate to the mash throughout the fermentation to control the acidity thereof whereby the final hydrogen ion concentration secured by the action of the bacteria falls within the range pH 5.0 to pH 6.5.

5. In a process for the production of normal butyl alcohol, acetone, and ethyl alcohol by subjecting a fermentable mash containing inverted carbohydrate, as the principal fermentable carbohydrate, to the action of a culture of bacteria of the group herein described and designated as *Clostridium inverto-acetobutylicum*, at temperatures from 25° C. to 36° C., the improvement which comprises supplying nitrogenous nutrient to the mash in the form of degraded protein nitrogen, and supplying non-toxic alkaline neutralizing agents to the mash throughout the fermentation to control the acidity thereof whereby the final hydrogen ion concentration secured by the action of the bacteria falls within the range pH 5.7 to pH 6.1.

6. In a process for the production of normal butyl alcohol, acetone, and ethyl alcohol by subjecting a fermentable mash containing inverted carbohydrate, as the principal fermentable carbohydrate, to the action of a culture of bacteria of the group herein described and designated as *Clostridium inverto-acetobutylicum*, at temperatures from 25° C. to 36° C., the improvement which comprises supplying nitrogenous nutrient to the mash in the form of degraded protein nitrogen, and supplying substantially water insoluble non-toxic alkaline neutralizing agents to the mash throughout the fermentation to control the acidity thereof whereby the final hydrogen ion concentration secured by the action of the bacteria falls within the range pH 5.7 to pH 6.1.

7. In a process for the production of normal butyl alcohol, acetone, and ethyl alcohol by subjecting a fermentable mash containing inverted carbohydrate, as the principal fermentable carbohydrate, to the action of a culture of bacteria of the group herein described and designated as *Clostridium inverto-acetobutylicum*, at temperatures from 25° C. to 36° C., the improvement which comprises supplying nitrogenous nutrient to the mash in the form of degraded protein nitrogen, and supplying calcium carbonate to the mash throughout the fermentation whereby the final hydrogen ion concentration secured by the action of the bacteria falls within the range pH 5.7 to pH 6.1.

8. In a process for the production of normal butyl alcohol, acetone, and ethyl alcohol by subjecting a fermentable mash containing inverted carbohydrate, as the principal fermentable carbohydrate, to the action of a culture of bacteria of the group herein described and designated as *Clostridium inverto-acetobutylicum*, at temperatures from 25° C. to 36° C., the improvement which comprises supplying nitrogenous nutrient to the mash in the form of a material selected from the group consisting of ammonia, ammonium salts, urea, yeast water and steep water, and supplying non-toxic alkaline neutralizing agents to the mash throughout the fermentation to control the acidity thereof whereby the final hydrogen ion concentration secured by the action of the bacteria falls within the range pH 5.0 to pH 6.5.

9. In a process for the production of normal butyl alcohol, acetone, and ethyl alcohol by subjecting a fermentable mash containing inverted carbohydrate, as the principal fermentable carbohydrate, to the action of a culture of bacteria of the group herein described and designated as *Clostridium inverto-acetobutylicum*, at temperatures from 25° C. to 36° C., the improvement which comprises supplying nitrogenous nutrient to the mash in the form of a material selected from the group consisting of ammonia, ammonium salts, urea, yeast water and steep water, and supplying substantially water insoluble non-toxic alkaline neutralizing agents to the mash throughout the fermentation to control the acidity thereof whereby the final hydrogen ion concentration secured by the action of the bacteria falls within the range pH 5.0 to pH 6.5.

10. In a process for the production of normal butyl alcohol, acetone, and ethyl alcohol by subjecting a fermentable mash containing inverted carbohydrate, as the principal fermentable carbohydrate, to the action of a culture of bacteria of the group herein described and designated as *Clostridium inverto-acetobutylicum*, at temperatures from 25° C. to 36° C., the improvement which comprises supplying nitrogenous nutrient to the mash in the form of a material selected from the group consisting of ammonia, ammonium salts, urea, yeast water and steep water, and supplying calcium carbonate to the mash throughout the fermentation to control the acidity thereof whereby the final hydrogen ion concentration secured by the action of the bacteria falls within the range pH 5.0 to pH 6.5.

11. In a process for the production of normal butyl alcohol, acetone, and ethyl alcohol by subjecting a fermentable mash containing inverted carbohydrate, as the principal fermentable carbohydrate, to the action of a culture of bacteria of the group herein described and designated as *Clostridium inverto-acetobutylicum*, at temperatures from 25° C. to 36° C., the improvement which comprises supplying nitrogenous nutrient to the mash in the form of degraded protein nitrogen, and supplying a neutralizing agent to the mash throughout the fermentation to control the acidity thereof, the said neutralizing agent being introduced into the mash in the form of an initial addition of calcium carbonate in a concentration of 3.5% to 10% based on the weight of the sugar in the mash in excess of that required to neutralize the initial acidity of the mash.

12. In a process for the production of normal butyl alcohol, acetone, and ethyl alcohol by subjecting a fermentable mash containing inverted carbohydrate, as the principal fermentable carbohydrate, to the action of a culture of bacteria of the group herein described and designated as *Clostridium inverto-acetobutylicum*, at temperatures from 25° C. to 36° C., the improvement which comprises supplying nitrogenous nutrient to the mash in the form of degraded protein nitrogen, and supplying a neutralizing agent to the mash throughout the fermentation to control the acidity thereof, the said neutralizing agent being introduced into the mash in the form of an initial addition of calcium carbonate in a concentration of approximately 6% based on the weight of the sugar in the mash in excess of that required to neutralize the initial acidity of the mash.

13. In a process for the production of normal butyl alcohol, acetone, and ethyl alcohol by subjecting a fermentable mash to the action of a culture of bacteria of the group herein described and designated as *Clostridium inverto-acetobutylicum*, at temperatures from 25° C. to 36° C., the improvement which comprises supplying the principal fermentable carbohydrate to the mash in the form of inverted molasses, supplying nitrogenous nutrient to the mash in the form of an ammonium compound and supplying non-toxic alkaline neutralizing agents to the mash throughout the fermentation to control the acidity thereof whereby the final hydrogen ion concentration secured by the action of the bacteria falls within the range pH 5.0 to pH 6.5.

14. In a process for the production of normal butyl alcohol, acetone, and ethyl alcohol by subjecting a fermentable mash to the action of a culture of bacteria of the group herein described and designated as *Clostridium inverto-acetobutylicum*, at temperatures from 25° C. to 36° C., the improvement which comprises supplying the principal fermentable carbohydrate to the mash in the form of inverted molasses, supplying nitrogenous nutrient to the mash in the form of an ammonium compound and supplying substantially water insoluble non-toxic alkaline neutralizing agents to the mash throughout the fermentation to control the acidity thereof whereby the final hydrogen ion concentration secured by the action of the bacteria falls within the range pH 5.0 to pH 6.5.

15. In a process for the production of normal butyl alcohol, acetone, and ethyl alcohol by subjecting a fermentable mash to the action of a culture of bacteria of the group herein described and designated as *Clostridium inverto-acetobutylicum*, at temperatures from 25° C. to 36° C., the improvement which comprises supplying the principal fermentable carbohydrate to the mash in the form of inverted molasses, supplying nitrogenous nutrient to the mash in the form of an ammonium compound and supplying calcium carbonate to the mash throughout the fermentation to control the acidity thereof whereby the final hydrogen ion concentration secured by the action of the bacteria falls within the range pH 5.0 to pH 6.5.

16. In a process for the production of normal butyl alcohol, acetone, and ethyl alcohol by subjecting a fermentable mash to the action of a culture of bacteria of the group herein described and designated as *Clostridium inverto-acetobutylicum*, at temperatures from 25° C., to 36° C., the improvement which comprises supplying the principal fermentable carbohydrate to the mash in the form of inverted molasses, supplying nitrogenous nutrient to the mash in the form of an ammonium compound and supplying substantially water insoluble non-toxic alkaline neutralizing agents to the mash throughout the fermentation to control the acidity thereof whereby the final hydrogen ion concentration secured by the action of the bacteria falls within the range pH 5.7 to pH 6.1.

17. In a process for the production of normal butyl alcohol, acetone, and ethyl alcohol by subjecting a fermentable mash to the action of a culture of bacteria of the group herein described and designated as *Clostridium inverto-acetobutylicum*, at temperatures from 25° C. to 36° C., the improvement which comprises supplying the principal fermentable carbohydrate to the mash in the form of inverted molasses, supplying nitrogenous nutrient to the mash in the form of an ammonium compound and supplying calcium carbonate to the mash throughout the fermentation to control the acidity thereof whereby the final hydrogen ion concentration secured by the action of the bacteria falls within the range pH 5.7 to pH 6.1.

18. In a process for the production of normal butyl alcohol, acetone, and ethyl alcohol by subjecting a fermentable mash to the action of a culture of bacteria of the group herein described and designated as *Clostridium inverto-acetobutylicum*, at temperatures from 25° C. to 36° C., the improvement which comprises supplying the principal fermentable carbohydrate to the mash in the form of inverted molasses, supplying nitrogenous nutrient to the mash in the form of an ammonium compound and supplying an alkaline neutralizing agent to the mash throughout the fermentation to control the acidity thereof, the said neutralizing agent being introduced in the form of an initial addition of calcium carbonate in a concentration of 3.5% to 10% based on the weight of the sugar in the mash in excess of that required to neutralize the initial acidity of the mash.

19. In a process for the production of normal butyl alcohol, acetone, and ethyl alcohol by subjecting a fermentable mash to the action of a culture of bacteria of the group herein described and designated as *Clostridium inverto-acetobutylicum*, at temperatures from 25° C. to 36° C., the improvement which comprises supplying the principal fermentable carbohydrate to the mash in the form of inverted molasses, supplying nitrogenous nutrient to the mash in the form of an ammonium compound and supplying an alkaline neutralizing agent to the mash throughout the fermentation to control the acidity thereof, the said neutralizing agent being introduced in the form of an initial addition of calcium carbonate in a concentration of approximately 6% based on the weight of the sugar in the mash in excess of that required to neutralize the initial acidity of the mash.

DAVID A. LEGG.
HUGH R. STILES.